United States Patent [19]

Schwarzenbach et al.

[11] 3,927,150

[45] Dec. 16, 1975

[54] BICYCLIC PHOSPHORUS COMPOUNDS

[75] Inventors: Kurt Schwarzenbach, Aesch; Siegfried Rosenberger, Riehen, both of Switzerland

[73] Assignee: Ciba-Geigy Corporation, Ardsley, N.Y.

[22] Filed: Sept. 21, 1973

[21] Appl. No.: 399,787

[30] Foreign Application Priority Data

Sept. 26, 1972 Switzerland.................... 14119/72

[52] U.S. Cl.......... 260/937; 106/15 FP; 252/400 A; 260/45.7 P; 260/45.7 PS; 260/212; 260/398.5; 260/485 R; 260/490; 260/570.8 R; 260/814; 260/968

[51] Int. Cl.²....................... C07F 9/15; C08K 5/53

[58] Field of Search..................................... 260/937

[56] References Cited
UNITED STATES PATENTS

| | | | |
|---|---|---|---|
| 3,168,549 | 2/1965 | Ratz.................................. | 260/937 |
| 3,808,296 | 4/1974 | Brunetti.......................... | 260/937 X |

*Primary Examiner*—Anton H. Sutto
*Attorney, Agent, or Firm*—Luther A. R. Hall

[57] ABSTRACT

Esters of 4-hydroxymethyl-1-phospha-2,6,7-trioxabicyclo[2,2,2]octan and p-hydroxyphenylcarboxylic acids are stabilisers for organic materials. They are prepared by reacting the 4-hydroxymethyl-1-phospha-2,6,7-trioxabicyclo[2,2,2]octan with a corresponding p-hydroxymethylcarboxylic acid.

12 Claims, No Drawings

BICYCLIC PHOSPHORUS COMPOUNDS

The present invention relates to new compounds, their manufacture and their use for stabilising organic material.

It is known to employ derivatives of sterically hindered phenols as stabilisers for plastics against thermooxidative or light-induced degradation. It is furthermore known to employ phosphorus compounds as co-stabilisers conjointly with phenolic antioxidants for stabilising purposes, and such mixtures frequently show a synergistic effect. It is also known to employ bicyclic phosphites, in which the phosphorus represents the bridgehead atom, as phosphorus compounds in such mixtures.

It has now been found, surprisingly, that the new compounds of the general formula I

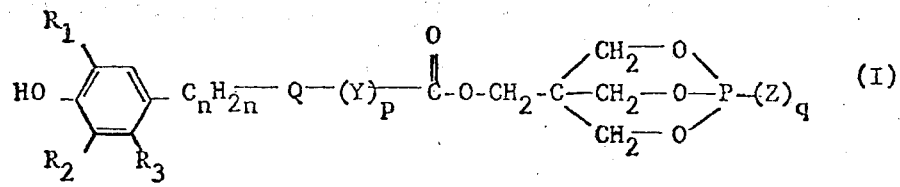

wherein $R_1$ denotes alkyl with 1 – 5 carbon atoms, cycloalkyl with 6 – 8 carbon atoms or aralkyl with 7 – 9 carbon atoms, $R_2$ denotes hydrogen, alkyl with 1 – 5 carbon atoms, cycloalkyl with 6 – 8 carbon atoms, or aralkyl with 7 – 9 carbon atoms, $R_3$ denotes hydrogen or methyl, Q denotes —O—, —NH—, —NHCO—, —OCO—, —SCO—, —NH—CO—NH—, —NH—COO—, —OCOO— and —NH—CS—NH—, Y denotes —$C_xH_{2x}$—, —$C_xH_x$—, —$(CH_2)_y$—S—$(CH_2)_z$—,

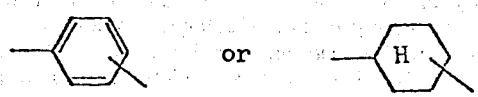

$x$ denotes 1 – 5 and $y$ and $z$ independently of one another denote 1 or 2, Z denotes oxygen or sulphur, $n$ denotes 0 to 5 and $p$ and $q$ independently of one another denote 0 or 1 are stabilisers of substantially better action than the action of the abovementioned synergistic mixtures of phenolic antioxidants with compounds containing phosphorus.

Preferred compounds of the formula I are those wherein $R_1$ denotes methyl, isopropyl or tert.butyl, $R_2$ denotes hydrogen, methyl, isopropyl or tert.butyl, $R_3$ denotes hydrogen, Q denotes —O—, —NH—, —NHCO—, —OCO— or —NHCONH—, Y denotes —$CH_2$—, $$-\overset{|}{\underset{CH_3}{C}}H-$$

or —$(CH_2)_2$—S—$(CH_2)_z$—, $z$ denotes 1 or 2, Z denotes oxygen or sulphur, $n$ denotes 0 to 4 and $p$ and $q$ independently of one another denote 0 or 1.

Particularly preferred compounds of the formula I are those wherein $R_1$ and $R_2$ denote tert.butyl, $R_3$ denotes hydrogen, Q denotes —O—, —NH—, —NHCO—, —OCO— or —NHCONH—, Y denotes —$CH_2$—, or —$(CH_2)_2$—S—$CH_2$—, Z denotes oxygen, $n$ denotes 0 to 4 and $p$ and $q$ independently of one another denote 0 or 1.

Amongst the preferred compounds there should above all be mentioned the following classes:

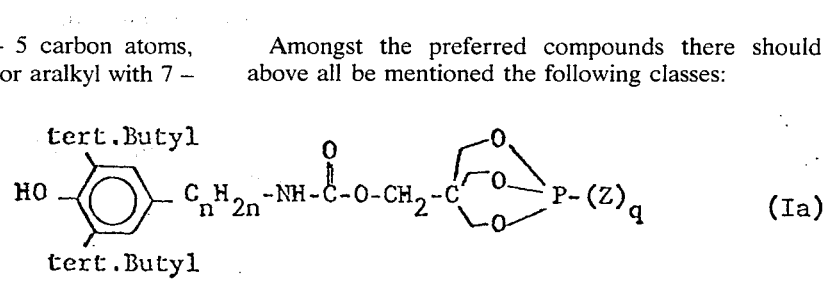

in which $n$ denotes 0 to 4, Z denotes oxygen or sulphur and $q$ denotes 0 or 1.

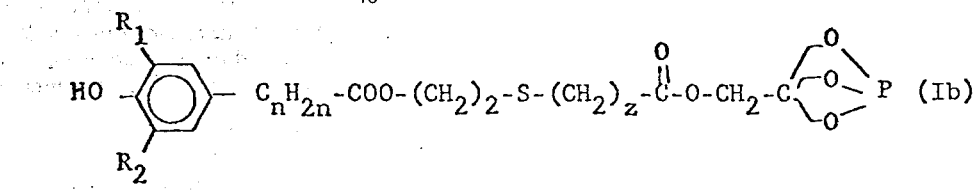

in which $R_1$ denotes methyl, isopropyl or tert.butyl, $R_2$ denotes hydrogen, methyl, isopropyl or tert.butyl, $n$ denotes 0 to 2 and $z$ denotes 1 or 2.

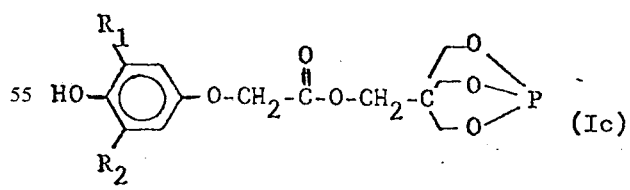

in which $R_1$ denotes methyl, isopropyl or tert.butyl and $R_2$ denotes hydrogen, methyl, isopropyl or tert.butyl.

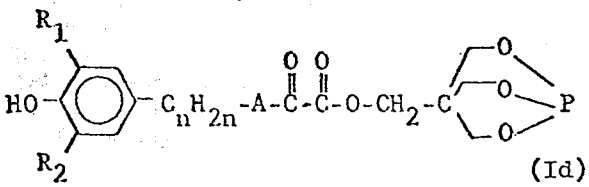

in which $R_1$ denotes methyl, isopropyl or tert.butyl, $R_2$ denotes hydrogen, methyl, isopropyl or tert.butyl, A denotes —O— or —NH— and $n$ denotes 0 or 1.

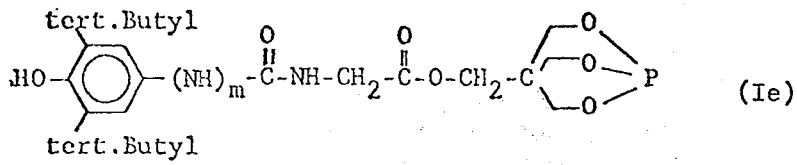

in which $m$ denotes 0 or 1.

If $R_1$ and/or $R_2$ in the formula I are alkyl, they can denote methyl, ethyl, isopropyl, tert.butyl, sec.butyl or t-pentyl. If $R_1$ and/or $R_2$ are cycloalkyl, they can be cyclohexyl, α-methylcyclohexyl or cyclooctyl. If $R_1$ and/or $R_2$ are aralkyl, they can denote benzyl, α-methylbenzyl or α,α-dimethylbenzyl.

If Y in the formula I is a $-C_rH_{2r}-$ radical, it can be

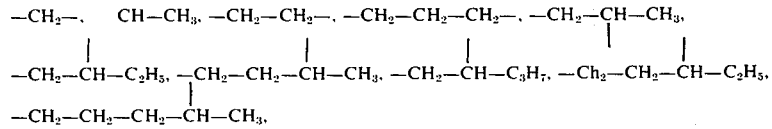

or —CH₂—CH₂—CH₂—CH₂—CH₂—.

If Y in the formula I denotes a $-C_rH_r-$ radical, it can be —CH=CH— or

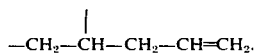

If Y denotes $-(CH_2)_y-S-(CH_2)_z-$, it can be, for example, the radical —CH₂—S—CH₂—, or —CH₂—S—CH₂—CH₂—.

Y can also be an o-, m- or p-phenylene radical or a 1,2-, 1,3- or 1,4-cyclohexylene radical.

Examples of compounds of the formula I are: 3,5Ditert.butyl-4-hydroxyphenyl-carbamic acid 1-phospha-2,6,7-trioxabicyclo-[2,2,2]-oct-4-yl-methyl ester, 2-[3-(3,5-ditert.butyl-4-hydroxyphenyl)propionyloxy]-ethylmercaptoacetic acid 1-phospha-2,6,7-trioxabicyclo-[2,2,2]-oct-4-yl-methyl ester, 2-(3,5-ditert.butyl-4-hydroxy-benzoyloxy)-ethylmercaptopropionic acid 1-phospha-2,6,7-trioxabicyclo-[2,2,2]-oct-4-yl-methyl ester, 2-[3-(3-tert.butyl-4-hydroxy-5-methylphenyl)-propionyloxy]-ethylmercaptoacetic acid 1-phospha-2,6,7-trioxabicyclo-[2,2,2]-oct-4-yl-methyl ester, 2-[3-tert.butyl-4-hydroxyphenyl)propionyloxy]-ethylmercaptoacetic acid 1-phospha-2,6,7-trioxabicyclo-[2,2,2]-oct-4-yl-methyl ester, 3,5-ditert-.butyl-4-hydroxyphenoxy-acetic acid 1-phospha-2,6,7-trioxabicyclo-[2,2,2]-oct-4-yl-methyl ester, 3-tert.butyl-4-hydroxyphenoxyacetic acid 1-phospha-2,6,7-trioxabicyclo-[2,2,2]-oct-4-yl-methyl ester, oxalic acid 1-phospha-2,6,7-trioxabicyclo-[2,2,2]-oct-4-yl-methyl ester-3,5-ditert.butyl-4-hydroxyanilide, oxalic acid 1-phospha-2,6,7-trioxabicyclo-[2,2,2]-oct-4-yl-methyl ester -3,5-diisopropyl-4-hydroxyanilide, oxalic acid 1-phospha-2,6,7-trioxabicyclo-[2,2,2]-oct-4-yl-methyl ester-3-tert.butyl-4-hydroxy-5-methylanilide and 3,5-ditert.butyl-4-hydroxyphenyl-carbamoylaminoacetic acid 1-phospha-2,6,7-trioxabicyclo-[2,2,2]-oct-4-yl-methyl ester.

Compounds of the formula I can be manufactured quite generally by reaction of 1 mol of a compound of the formula II

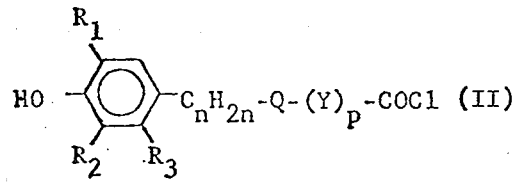

with 1 mol of a compound of the formula III

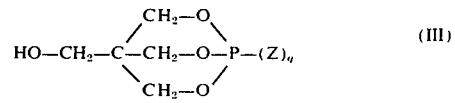

in the presence of a base for neutralising the hydrochloric acid produced.

This process, for example, is particularly successful for obtaining the compounds of the formula Ic.

A further manufacturing process consists of the reaction of 1 mol of a compound of the formula IV

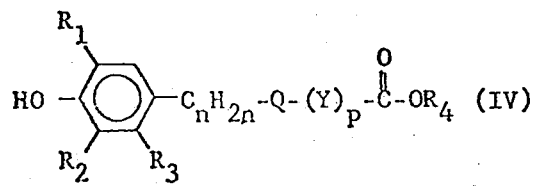

wherein $R_4$ denotes a lower alkyl group, preferably methyl or ethyl, with 1 mol of a compound of the formula III in the presence of catalytic amounts of a basic catalyst. In this reaction, 1 mol of $R_4OH$ is eliminated.

Examples of basic catalysts which are used are alkali metal amides such as sodium amide or lithium amide, alkali metal hydroxides such as lithium hydroxide, sodium hydroxide or potassium hydroxide, alcoholates such as the sodium and magnesium alcoholates of methanol, ethanol or tert.butanol or tertiary amines such as triethylamine. Preferred basic catalysts are sodium methylate, sodium hydride and lithium amide.

This process is preferentially used for the manufacture of the compounds of the formula Ic, Id and Ie.

The compounds of the formula I, in which Q denotes

—NH— and p denotes zero, can also be manufactured by the reaction of 1 mol of a compound of the general formula V

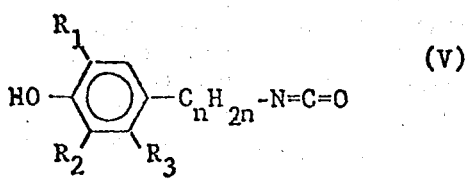

with 1 mol of a compound of the formula III.

The reaction can be carried out in an aliphatic or aromatic hydrocarbon such as benzine of defined boiling range, benzene, toluene or xylene as the solvent. Preferably, no solvent is used.

The compounds of the formula Ia can be manufactured in this way.

The compounds of the formula Ib can advantageously be manufactured by reaction of a mercaptan of the formula

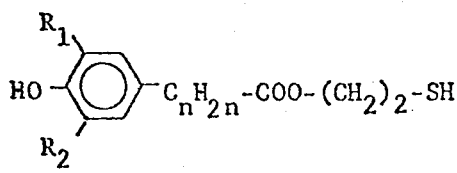

with the chloroacetic acid ester or acrylic acid ester of the formulae

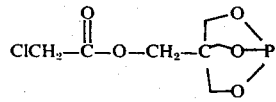

or

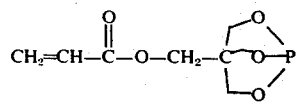

The starting compounds for the manufacture of the compounds Ia, Ib, Ic, Id and Ie are known in some cases. Where they are new, they can be obtained as described below.

The compounds of the formula V, required for the manufacture of the compounds of the formula Ia, wherein $R_1$ and $R_2$ denote tert.butyl and $R_3$ denotes hydrogen, are obtained by reaction of an amine of the formula Va

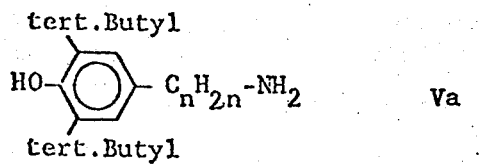

with phosgene. The amines of the formula Va wherein n denotes 0 or 1 are known. Compounds of the formula Va wherein n denotes 2 to 4 are obtained by reaction of a compound of the formula

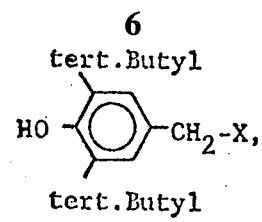

wherein X denotes a halogen atom, a

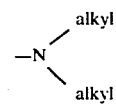

group or

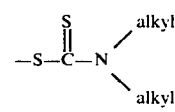

group, with a nitro compound of the formula

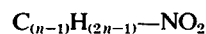

$$C_{(n-1)}H_{(2n-1)}-NO_2$$

optionally in the presence of a basic catalyst, with subsequent reduction with zinc or hydrogen.

The starting compounds of the formula

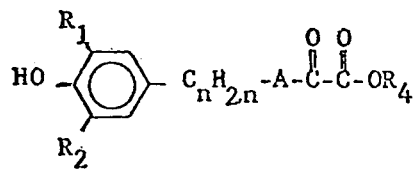

required for the manufacture of the compounds of the formula Id, wherein $R_4$ denotes lower alkyl, are obtained by reaction of a compound of the formula

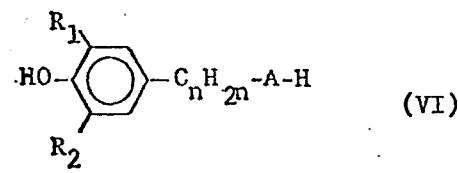

with an oxalic acid monoalkyl ester chloride of the formula

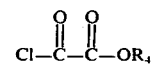

in the presence of a base for binding the hydrochloric acid liberated.

The starting compounds of the formula

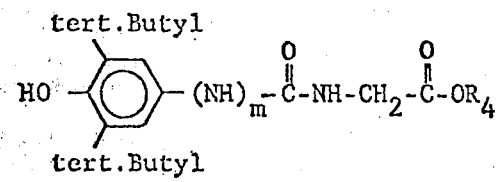

required for the manufacture of the compounds of the formula Ie, wherein $R_4$ denotes lower alkyl, are obtained by reaction of a compound of the formulae

```
   tert.Butyl                        tert.Butyl
       \                                 \
HO ─⟨◯⟩─ NCO      or       HO ─⟨◯⟩─ COCl
       /                                 /
   tert.Butyl                        tert.Butyl
``` with an ester of glycine, of the formula $$H_2N—CH_2COOR_4$$

The compounds of the formula I are used as stabilisers for organic substrates. As such it is possible to use, for example:

1. Polymers which are derived from hydrocarbons with single or double unsaturation, such as polyolefines, such as, for example polyethylene, which can optionally be crosslinked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylenepropylene copolymers, propylene-butene-1 copolymers, propylene-isobutylene copolymers, styrene-butadiene copolymers and terpolymers of ehtylene and propylene with a diene, such as, for example, hexadiene, dicyclopentadiene or ethylidenenorbornene; mixtures of the abovementioned homopolymers, such as, for example, mixtures of polypropylene and polyethylene, polypropylene and polybutene-1, or polypropylene and polyisobutylene.
2. Vinyl polymers containing halogen, such as polyvinyl chloride, polyvinylidene chloride, polyvinyl fluoride, but also polychloroprene and chlorinated rubbers.
3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymers.
4. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallyl melamine and their copolymers with other vinyl compounds, such as ethylene/vinyl acetate copolymers.
5. Homopolymers and copolymers which are derived from epoxides, such as polyethylene oxide or the polymers which are derived from bis-glycidyl ethers.
6. Polyacetals, such as polyoxymethylene and polyoxyethylene, as well as those polyoxymethylenes which contain ethylene oxide as the comonomer.
7. Polyphenylene oxides.
8. Polyurethanes and polyureas.
9. Polycarbonates.
10. Polysulphones.
11. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.
12. Polyesters which are derived from dicarboxylic acids and dialcohols and/or from hydroxycarboxylic acids or the corresponding lactones, such as polyethylene glycol terephthalate or poly-1,4-dimethylolcyclohexane terephthalate.
13. Crosslinked polymers which are derived from aldehydes on the one hand and phenols, ureas and melamines on the other, such as phenol-formaldehyde, urea-formaldehyde and melamine-formaldehyde resins.
14. Alkyd resins, such as glycerine-phthalic acid resins and their mixtures with melamine-formaldehyde resins.
15. Unsaturated polyester resins which are derived from copolyesters of saturated and unsaturated dicarboxylic acids with polyhydric alcohols, with vinyl compounds as crosslinking agents, and also their halogen-containing modifications of low inflammability.
16. Natural polymers such as cellulose, rubber, proteins and their polymer-homologously chemically modified derivatives, such as cellulose acetates, cellulose propionates and cellulose butyrates, or the cellulose ethers, such as methylcellulose.
17. High molecular monomeric substances, for example mineral oils, animal and vegetable fats, oils and waxes, or oils, waxes and fats based on synthetic esters.

The compounds of the formula I are incorporated into the substrates in a concentration of 0.01 to 5% by weight calculated relative to the material to be stabilised.

Preferably, 0.05 to 2.0, and particularly preferentially 0.1 to 1.0,% by weight of the compounds, calculated relative to the material to be stabilised, are incorporated into the latter. The incorporation can take place before or during shaping, for example by mixing in at least one of the compounds of the formula I and optionally further additives according to the methods customary in the art, or by applying the dissolved or dispersed compounds to the polymer, if appropriate wth subsequent evaporation of the solvent.

In the case of crosslinked polyethylene, the compounds are added before crosslinking.

The compounds of the formula I can also be added before or during polymerisation, and possible incorporation into the polymer chain results in stabilised substrates in which the stabilisers are not volatile or extractable.

As further additives together with which the stabilisers can be employed, there should be mentioned:

1. Antioxidants of the hydroxyaryl series, such as, for example,

A. Simple 2,6-dialkylphenols such as, for example, 2,6-ditert.butyl-4-methylphenol, 2-tert.butyl-4,6-dimethylphenol, 2,6-ditert.butyl-4-methoxymethylphenol and 2,6-dioctadecyl-4-methylphenol.

B. Derivatives of alkylated hydroquinones such as, for example, 2,5-ditert.butyl-hydroquinone, 2,5-ditert.amyl-hydroquinone, 2,6-ditert.butyl-hydroquinone, 2,5-ditert.butyl-4-hydroxy-anisole, 3,5-ditert.butyl-4-hydroxy-anisole, tris-(3,5-ditert.butyl-4-hydroxyphenyl)-phosphite, 3,5-ditert.butyl-4-hydroxyphenyl-stearate and di-(3,5-ditert.butyl-4-hydroxyphenyl)-adipate.

C. Hydroxylated thiodiphenyl ethers such as, for example, 2,2'-thiobis-(6-tert.butyl-4-methylphenol), 2,2'-thiobis-(4-octylphenol), 4,4'-thiobis-(6-tert.butyl-3-methylphenol), 4,4'-thiobis-(3,6-di-sec.amylphenol), 4,4'-thiobis-(6-tert.butyl-2-methylphenol) and 4,4'-bis(2,6-dimethyl-4-hydroxyphenyl)-disulphide.

D. Alkylidene-bisphenols such as, for example, 2,2'-methylene-bis-(6-tert.butyl-4-methylphenol),2,2'-methylene-bis-(6-tert.butyl-4-ethylphenol), 4,4'-methylene-bis-(6-tert.butyl-2-methylphenol), 4,4'-methylene-bis-(2,6-ditert.butylphenol), 2,6-di-(3-tert.butyl-5-methyl-2-hydroxybenzyl)-4-methylphenol, 2,2'-methylene-bis-[4-methyl-6-(α-methylcyclohexyl)-phenol], 1,1-bis-(3,5-dimethyl-2-hydroxyphenyl)-butane, 1,1-bis-(5-tert.butyl-4-hydroxy-2-methylphenyl)-butane, 2,2-bis-(5-tert.butyl-4hydroxy-2-methylphenyl)-butane, 2,2-bis-(3,5-di-tert.butyl-4-hydroxyphenyl)-propane, 1,1,3-tris-(5-tert.butyl-4-hydroxy-2-methylphenyl)-butane, 2,2-bis-(5-tert.butyl-4-hydroxy-2-methylphenyl)-4-n-dodecylmercaptobutane, 1,1,5,5-tetra-(5-tert.butyl-4-hydroxy-2-methylphenyl)-pentane and ethylene-glycol-bis-[3,3-bis-(3'-tert.butyl-4'-hydroxyphenyl)-butyrate].

E. O-, N- and S-benzyl compounds such as, for example, 3,5,3',5'-tetra-tert.butyl-4,4'-dihydroxydibenzyl ether, 4-hydroxy-3,5-dimethylbenzyl-mercaptoacetic acid octadecyl ester, tri-(3,5-di-tert.butyl-4-hydroxybenzyl)-amine and bis-(4-tert.butyl-3-hydroxy-2,6-dimethylbenzyl)-dithiol terephthalate.

F. Hydroxybenzylated malonic esters such as, for example, 2,2-bis-(3,5-di-tert.butyl-2-hydroxybenzyl)-malonic acid dioctadecyl ester, 2-(3-tert.butyl-4-hydroxy-5-methylbenzyl)-malonic acid dioctadecyl ester, 2,2-bis-(3,5-ditert.butyl-4-hydroxybenzyl)-malonic acid didodecylmercapto ethylester and 2,2-bis-(3,5-ditert.butyl-4-hydroxybenzyl)-malonic acid di-(4-tert.octylphenyl) ester.

G. Hydroxybenzyl-aromatics such as, for example, 1,3,5-tri-(3,5-ditert.butyl-4-hydroxybenzyl)-2,4,6-trimethylbenzene, 1,4-di-(3,5-ditert.butyl-4-hydroxybenzyl)-2,3,5,6-tetramethylbenzene and 2,4,6-tri-(3,5-ditert.butyl-4-hydroxybenzyl)-phenol.

H. s-Triazine compounds such as, for example, 2,4-bis-octylmercapto-6-(3,5-ditert.butyl-4-hydroxyanilino)-s-triazine, 2-octylmercapto-4,6-bis-(3,5-ditert.butyl-4-hydroxyanilino)-s-triazine, 2-octylmercapto-4,6-bis-(3,5-ditert.butyl-4-hydroxyphenoxy)-s-triazine, 2,4,6-tris-(3,5-ditert.butyl-4-hydroxyphenoxy)-s-triazine, 2,4,6-tris-(3,5-ditert.butyl-4-hydroxyphenylethyl)-s-triazine and 1,3,5-tris-(3,5-ditert.butyl-4-hydroxybenzyl)-isocyanurate.

I. Amides of 3,5-ditert.butyl-4-hydroxyphenylpropionic acid such as, for example, 1,3,3-tri-(3,5-ditert.butyl-4-hydroxyphenyl-propionyl)-hexahydro-s-triazine and N,N'-di-(3,5-ditert.butyl-4-hydroxyphenyl-propionyl)-hexamethylenediamine.

K. Esters of 3,5-ditert.butyl-4-hydroxyphenylpropionic acid with monohydric or polyhydric alcohols, such as, for example, methanol, ethanol, octadecanol; 1,6-hexanediol; 1,9-nonanediol, ethylene glycol; 1,2-propanediol, diethylene glycol, thiodiethylene glycol, neopentyl glycol, 3-thiaundecanol, 3-thiapentadecanol, trimethylhexanediol, trimethylolethane, trimethylolpropane, pentaerythritol, tris-hydroxyethyl-isocyanurate and 4-hydroxymethyl-1-phospha-2,6,7-trioxabicyclo[2,2,2]octane.

L. Esters of 5-tert.butyl-4-hydroxy-3-methylphenyl-propionic acid with monohydric or polyhydric alcohols such as, for example, methanol, ethanol, octadecanol; 1,6-hexanediol; 1,9-nonanediol, ethylene glycol; 1,2-propanediol, diethylene glycol, thiodiethylene glycol, neopentyl glycol, 3-thiaundecanol, 3-thia-pentadecanol, trimethylhexanediol, trimethylolethane, trimethylolpropane, pentaerythritol, trishydroxyethyl-isocyanurate and 4-hydroxymethyl-1-phospha-2,6,7-trioxa-bicyclo[2,2,2]octane.

M. Esters of 3,5-ditert.butyl-4-hydroxyphenylacetic acid with monohydric or polyhydric alcohols such as, for example, methanol, ethanol, octadecanol; 1,6-hexanediol; 1,9-nonanediol, ethylene glycol, 1,2-propanediol, diethylene glycol, thiodiethylene glycol, neopentyl glycol, 3-thiaundecanol, 3-thia-pentadecanol, trimethylhexanediol, trimethylolethane, trimethylolpropane, pentaerythritol, trishydroxyethylisocyanurate and 4-hydroxymethyl-1-phospha-2,6,7-trioxabicyclo[2,2,2]octane.

N. Acylaminophenols such as, for example, N-(3,5-di-tert.butyl-4-hydroxyphenyl)-stearic acid amide and N,N'-di-(3,5-ditert.butyl-4-hydroxyphenyl)-thiobisacetamide.

O. Benzylphosphonates such as, for example, 3,5-ditert.butyl-4-hydroxybenzyl-phosphonic acid dimethyl ester, 3,5-ditert.butyl-4-hydroxybenzyl-phosphonic acid diethyl ester, 3,5-ditert.butyl-4-hydroxybenzyl-phosphonic acid dioctadecyl ester and 5-tert.butyl-4-hydroxy-3-methylbenzyl-phosphonic acid dioctadecyl ester.

Combination with antioxidants from the class of the sterically hindered phenols are particularly valuable because sterically hindered phenols are stabilisers for polyolefines which are effective under the moulding and processing conditions and show synergistic effects with the compounds according to the invention. Such a synergistic (super-additive) activity was not foreseeable and represents a further aspect of the present invention.

2. Antioxidants of the aminoaryl series, above all aniline and naphthylamine derivatives as well as their heterocyclic derivatives, for example: Phenyl-1-naphthylamine, phenyl-2-naphthylamine, N,N'-diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl and polymerised 2,2,4-trimethyl-1,2-dihydroquinoline.

2. UV absorbers and light protection agents, such as:
a. 2-(2'-Hydroxyphenyl)-benztriazoles, for example 2-(2'-hydroxy-5'-methylphenyl)-benztriazole, 2-(2'-hydroxy-3',5'-di-tert.butylphenyl)-benztriazole, 2(2'-hydrozy-5'-tert.butylphenyl)-benztriazole, 2-(2'-hydroxy-3',5'-tert.butylphenyl)-5-chloro-benztriazole, 2-(2'-hydroxy-3'-tert.butyl-5'-methylphenyl)-5-chlorobenztrizole, 2-(2'-hydroxy-3'-sec.butyl-5'-tert.butylphenyl)-benztriazole, 2-(2'-hydroxy-3'-[α-methylbenzyl]-5'-methylphenyl)-benztriazole, 2-(2'-hydroxy-3'-[α-methylbenzyl]5'-methylphenyl)-5-chloro-benztriazole, 2-(2'-hydroxy-4'-octoxyphenyl)-benztriazole, 2-(2'-hydroxy-3',5'-di-tert.amylphenyl)-benztriazole, 2(2'-hydroxy-3'-methyl-5'-carbomethoxyethylphenyl)-benztriazole, 2-(2'-hydroxy-3',5'-di-tert.amylphenyl)-5-chloro-benztriazole, 2-(2'-hydroxy-5'-[1,1,3,3-tetramethylbutyl]-phenyl)-benztriazole, 2-(2'-hydroxy-4'-hydroxyphenyl)-benztriazole and 2-(2'-hydroxy-4'-methoxyphenyl)-benztriazole.

b. 2,4-Bis-(2'-hydroxyphenyl)-6-alkyl-s-triazines, for example the 6-ethyl-,6-undecyl or 6-heptadecyl-derivative.

c. 2-Hydroxy-benzophenones, for example 2,4-dihydroxybenzophenone, 2-hydroxy-4-methoxy-benzophenone, 2-hydroxy-4-octoxy-benzophenone, 2-hydroxy-4-decyloxy-benzophenone, 2-hydroxy-4-dodecyloxybenzophenone, 2-hydroxy-4-benzyloxybenzophenone, 2,4,2',4'-tetrahydroxy-benzophenone or 2,2'-dihydroxy-4,4'-dimethoxy-benzophenone.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene, and 1,3-bis-(2'-hydroxy-4'-dodecyloxy-benzoyl)-benzene.

e. Aryl esters of optionally substituted benzoic acids such as, for example, phenyl salicylate, octylphenyl salicylate, di-benzoylresorcinol, bis-(4-tert.butylbenzoyl)-resorcinol, benzoylresorcinol and 3,5-di-tert.butyl-4-hydroxybenzoic acid 2,4-di-tert.butyl-phenyl ester, octadecyl ester of 2-methyl-4,6-di-tert.butyl-phenyl ester.

f. Acrylates, for example α-cyano-β,β-diphenylacrylic acid ethyl ester or isooctyl ester, α-carbomethoxycinnamic acid methyl ester, α-cyano-β-methyl-p-methoxy-cinnamic acid methyl ester or butyl ester and N-(β-carbomethoxy-vinyl)-2-methyl-indoline.

g. Nickel compounds, for example nickel complexes of 2,2'-thiobis-(4-tert.octylphenol), such as the 1:1 and 1:2 complex, optionally with other ligands such as n-butylamine, nickel complexes of bis-(4-tert.octylphenyl)-sulphone, such as the 2:1 complex, optionally with other ligands such as 2-ethylcaproic acid, nickel dibutyldithiocarbamate, nickel salts of 4-hydroxy-3,5-di-tert.butylbenzyl-phosphonic acid monoalkyl esters such as the methyl, ethyl or butyl ester, the nickel complex of 2-hydroxy-4-methyl-phenyl-undecylketonoxime and nickel 3,5-ditert.butyl-4-hydroxy-benzoate.

h. Oxalic acid diamides, for example 4,4'-di-octyloxy anilide, 2,2'-di-octyloxy-5,5'-di-tert.butyl-oxanilide, 2,2'-di-dodecyloxy-5,5'-di-tert.butyl-oxanilide, 2-ethoxy-5-tert.butyl-2'-ethyl-oxanilide, 2-ethoxy-2'ethyl-oxanilide, N,N'-bis-(3-dimethylaminopropyl)oxalamide, mixtures of o-and p-methoxy- and o- and p-ethoxy-di-substituted oxanilides and mixtures of 2-ethoxy-5-tert.butyl-2'-ethyl-oxanilide with 2-ethoxy-2'-ethyl-4,4'-di-tert.butyl-oxanilide.

3. Metal deactivators, such as oxanilide, isophthalic acid dihydrazide, sebacic acid bis-phenylhydrazide, bis-benzylideneoxalic acid dihydrazide, N,N'-diacetyl-adipic acid dihydrazide, N,N'-bis-salicyloyl-oxalic acid dihydrazide, N,N'-bis-salicyloyl-hydrazine and N,N'-bis-(3,5-ditert.butyl-4-hydroxyphenyl-propionyl)-hydrazine.

4. Phosphates, such as triphenylphosphite, diphenylalkylphosphites, phenyldialkylphosphites, trinonylphenylphosphite, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

5. Compounds which destroy peroxides, such as esters of β-thiodipropionic acid, for example the lauryl, stearyl, myrystyl or tridecyl esters, salts of 2-mercaptobenzimidazole, for example the zinc salt, and diphenylthiourea for polyolefines.

6. Polyamide stabilisers, such as copper salts in combination with iodides and/or further phosphorus compounds and salts of divalent manganese.

7. Basic co-stabilisers, such as polyvinyl pyrrolidone, melamine, benzoguanamine, triallyl-cyanurate, dicyandiamide, urea derivatives, hydrazine derivatives, amines, polyamides, polyurethanes, and alkali metal salts and alkaline earth metal salts of higher saturated or unsaturated fatty acids such as, for example, the laurates, myristates, palmitates, stearates, oleates or ricinoleates of calcium, magnesium, zinc, sodium or potassium. Such salts are advantageously added to the stabiliser according to the invention, in concentrations of 0.1 to 70% by weight, preferably 30–60% by weight, prior to incorporation into the material to be protected.

8. PVC stabilisers such as organic tin compounds, organic lead compounds and Ba/Cd salts of fatty acids.

9. Nucleating agents, such as 4-tert.butylbenzoic acid, adipic acid and diphenylacetic acid.

10. Other additives such as plasticisers, lubricants for example glycerine monostearate, emulsifiers, antistatic agents, flameproofing agents, pigments, carbon black, asbestos, glass fibres, kaolin and talc.

The invention is explained in more detail in the examples which follow. Per cent (%) in the examples denotes per cent by weight and parts in the examples denote parts by weight.

EXAMPLE 1

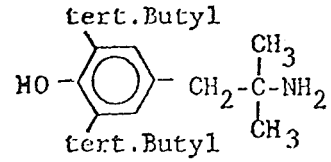

1st Step 106 g of N,N-dimethyl-(3,5-di-tert.butyl-4-hydroxybenzyl)amine and 400 ml of 2-nitropropane are heated to 110°C for 8 hours. The orange-coloured solution is concentrated in vacuo, mixed with 70 ml of petroleum ether and cooled. 1-(3,5-Di-tert.butyl-4-hydroxybenzyl)-2-nitropropane crystallises out on cooling. It has a melting point of 100° – 105°C.

2nd Step 92 g of 2-(3,5-di-tert.butyl-4-hydroxybenzyl)-2-nitropropane, 500 ml of glacial acetic acid, 400 ml of concentrated hydrochloric acid, 900 ml of water and 78 g of zinc dust are mixed and the mixture is heated to 100°C for 5½ hours. The solution is filtered hot and then cooled to room temperature. The hydrochloride of 2-(3,5-di-tert.butyl-4-hydroxybenzyl)-2-aminopropane precipitates slowly. The crystals are filtered off and boiled once with 500 ml of 20% strength hydrochloric acid, and then dried. The product sublimes at temperatures above 200°C.

To prepare the free amine, the hydrochloride is dissolved in a large amount of boiling water and the solution is filtered hot and subsequently treated with concentrated aqueous ammonia. The 2-(3,5-di-tert.butyl-4-hydroxybenzyl)-2-aminopropane which has precipitated is filtered off and dried. It has a melting point of 110°C.

EXAMPLE 2

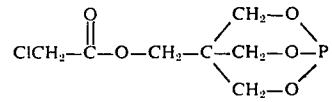

8.2 g of 4-hydroxymethyl-1-phospha-2,6,7-trioxabicyclo-[2,2,2]-octane are dissolved in 70 ml of acetone. After adding 5.0 g of triethylamine, 5.8 g of chloroacetyl chloride are added dropwise at room temperatures over the course of 10 minutes. The mixture is stirred for one hour at room temperature and then filtered and evaporated. A viscous oil remains, which is chloroacetic acid 1-phospha-2,6,7-trioxabicyclo-[2,2,2]-oct-4-yl-methyl ester.

EXAMPLE 3

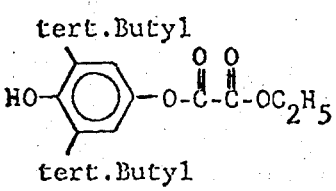

11.1 g of 2,6-di-tert.butyl-hydroquinone are dissolved in 100 ml of dimethylacetamide. After adding 4.0 g of pyridine, 6.8 g of oxalic acid monoethyl ester chloride are added dropwise over the course of 15 minutes at room temperature. The mixture is stirred for 1 hour at 80°C and then poured into 700 ml of ice water. The organic material is extracted with ether. After evaporation of the ether solution, a yellow oil remains, which slowly crystallises. After recrystallisation from a mixture of 50 ml of methanol and 8 ml of water, oxalic acid 3,5-di-tert.butyl-4-hydroxyphenyl ester/ethyl ester of melting point 60°–61°C is obtained.

EXAMPLE 4

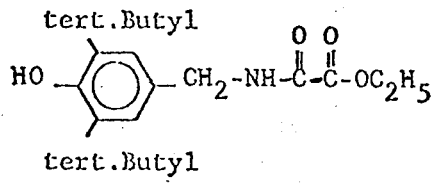

9.0 g of 3,5-di-tert.butyl-4-hydroxy-benzylamine are suspended in 60 ml of methylene chloride. A solution of 5.3 g of oxalic acid monoethyl ester chloride in 50 ml of methylene chloride is added dropwise to the mixture at below 30°C. After adding 3.1 g of pyridine, the mixture is boiled for 4 hours. The methylene chloride solution is washed with dilute sodium hydroxide solution and then with dilute hydrochloric acid, and evaporated. The oxalic acid monoethyl ester 3,5-di-tert.butyl-4-hydroxybenzyl-amide which remains melts at 143°C after recrystallisation form cyclohexane.

EXAMPLE 5

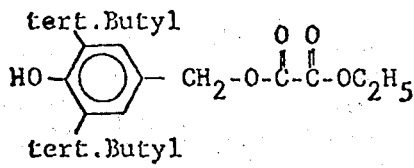

11.8 g of 3,5-di-tert.butyl-4-hydroxy-benzyl alcohol are dissolved in 100 ml of dimethylacetamide. 6.8 g of oxalic acid monethyl ester chloride are added dropwise over the course of 15 minutes at room temperature. The mixture is stirred for one hour at 50°C and then poured into 500 ml of ice water. The product which has separated out crystallises slowly. The solid is filtered off, dried and recrystallised from hexane. Oxalic acid 3,5-di-tert.butyl-4-hydroxybenzyl ester/ethyl ester of melting point 56°–57°C is thus obtained.

EXAMPLE 6

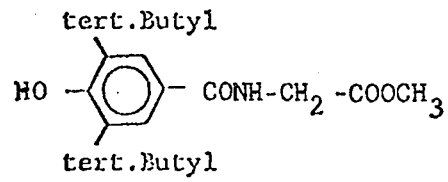

25 g of glycine methyl ester are first taken and 5.0 g of 3,5-di-tert.butyl-4-hydroxybenzoyl chloride are added in portions whilst stirring. The mixture is stirred for one hour and then diluted with 200 ml of ether. The ether solution is extracted by shaking with dilute hydrochloric acid and then evaporated. On addition of cyclohexane, the product crystallises. N-(3,5-Di-tert.butyl-4-hydroxybenzoyl)-aminoacetic acid methyl ester of melting point 116°–118°C is thus obtained.

EXAMPLE 7

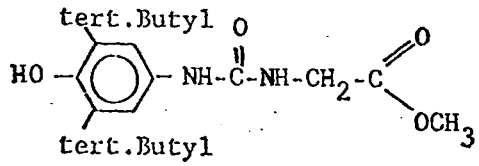

12.3 g of 3,5-di-tert.butyl-4-hydroxphenylisocyanate are dissolved in 100 ml of ligroin. 4.4 g of glycine methyl ester are added dropwise to the solution at room temperature. The product first separates out as an oil and becomes crystalline after stirring the mixture at 70°C for one hour. After cooling, the mixture is filtered and the product recrystallised from toluene. 3,5-Di-tert.butyl-4-hydroxyphenyl-carbamoyl-aminoacetic acid methyl ester of melting point 195°C is thus obtained.

EXAMPLE 8

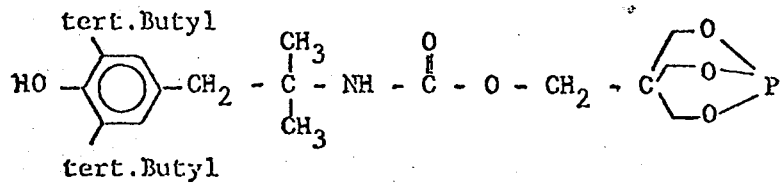

29 g of 2-(3,5-di-tert.butyl-4-hydroxybenzyl)-2-aminopropane are dissolved in 400 ml of toluene. A slow stream of phosgene is passed into the solution, which is heated to the boil, for 6 hours. The solution is evaporated in vacuo. The crude 2-(3,5-di-tert.butyl-4-hydroxyphenyl)-1,1-dimethyl-ethylisocyanate which remains is used in situ for the next stage. 16.4 g of 4-hydroxymethyl-1-phospha-2,6,7-trioxabicyclo-[2,2,2]-octane are added and the resulting mixture is heated to 110°C whilst stirring.

On cooling, a glassy substance results, of which the infrared spectrum agrees with the structure of 1,1-dimethyl-2-(3,5-di-tert.butyl-4-hydroxyphenyl)-ethyl-carbamic acid 1-phospha-2,6,7-trioxabicyclo-[2,2,2]-oct-4-yl-methyl ester.
(Stabiliser No. 1).
P: Calculated: 6.50% found: 6.34%

EXAMPLE 9

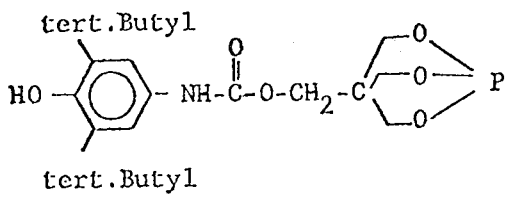

24.7 g of 3,5-di-tert.butyl-4-hydroxyphenylisocyanate and 16.4 g of 4-hydroxymethyl-1-phospha-2,6,7-trioxabicyclo-[2,2,2]-octane are together heated to 110°C under nitrogen for one hour. The initially clear melt solidifies after a short time. After recrystallisation from benzene, 3,5-di-tert.butyl-4-hydroxyphenyl-carbamic acid 1-phospha-2,6,7-trioxabicyclo-[2,2,2]-oct-4-yl-methyl ester melts at 202°C. (Stabiliser No. 2).

EXAMPLE 10

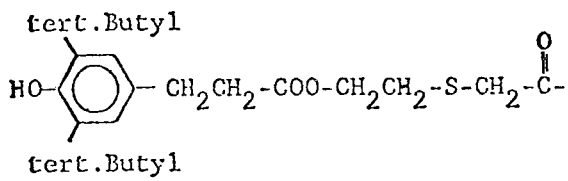

17 g of β-mercaptoethyl-3-(3,5-di-tert.butyl-4-hydroxyphenyl)-propionate and 12.0 g of 4-hydroxymethyl-1-phospha-2,6,7-trioxabicyclo-[2,2,2]-octane chloroacetate are first introduced into 100 ml of absolute ethanol under nitrogen. A solution of 2.7 g of potassium hydroxide in 30 ml of ethanol is added dropwise at room temperature. When the exothermic reaction has subsided, the mixture is filtered and the filtrate is evaporated. The product is isolated from the residue by column chromatography, eluting with a mixture of toluene and methanol (1:1). The resulting 2-[3-(3,5-di-tert.-butyl-4-hydroxyphenyl)propionyloxyl]-ethylmercaptoacetic acid 1-phospha-2,6,7-trioxa-bicyclo-[2,2,2]-oct-4-yl-methyl ester is a light yellow, viscous liquid. (stabiliser (Stabiliser 3): P: Calculated: 5.7% found: 5.4%

EXAMPLE 11

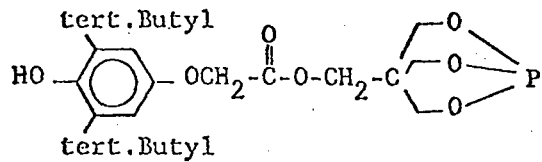

8.2 g of 4-hydroxymethyl-1-phospha-2,6,7-trioxabicyclo-[2.2.2]-octane are dissolved in 50 ml of dimethylacetamide. A solution of 16.5 g of 3,5-di-tert.butyl-4-hydroxyphenoxyacetyl chloride in 50 ml of dimethylacetamide is added dropwise with vigorous stirring, in the course of which the temperature rises to 40°C. The mixture is stirred for one hour at 80°C, cooled and poured into 2 liters of water. The product which in part is obtained in a crystalline form is extracted with ether and the ether phase is dried and evaporated. The solid which remains is recrystallised from alcohol. 3,5-Di-tert.-butyl-4-hydroxyphenoxyacetic acid 1-phospha-2,6,7-trioxabicyclo-[2,2,2]-oct-4-yl-methyl ester, (stabiliser No. 4) of melting point 142°C is thus obtained.

If, in this example, the 3,5-di-tert.butyl-4-hydroxyphenoxy-acetyl chloride is replaced by an equimolecular amount of 3-tert.butyl-4-hydroxy-5-methylphenoxyacetyl chloride and otherwise the same procedure is followed. 3-tert.butyl-4-hydroxy-5-methylphenoxyacetic acid 1-phospha-2,6,7-trioxabicyclo-[2,2,2]oct-4-yl-methyl ester is obtained.

EXAMPLE 12

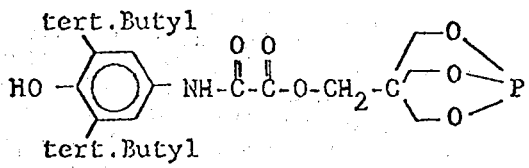

16 g of oxalic acid monoethyl ester 3,5-di-tert.butyl-4-hydroxy-anilide and 10 g of 4-hydroxymethyl-1-phos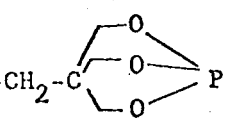pha-2,6,7-trioxabicyclo-[2,2,2]-octane are first introduced into 50 ml of diethylene glycol dimethyl ether. After adding 0.4 g of sodium methylate, the mixture is heated to 130°C for 2 hours. After cooling, it is poured into 700 ml of water, the product which has separated out is extracted with ether and the ether solution is dried and evaporated. The residue is dissolved in a little hot alcohol and hexane is added to the solution, whereupon the crystallisation starts. For further purification, the product is again recrystallised from carbon tetrachloride and subsequently stirred with boiling cyclohexane, filtered off and dried. Oxalic acid 1-phospha-2,6,7-trioxabicyclo-[2,2,2]-oct-4-yl-methyl ester 3,5-di-tert.butyl-4-hydroxyanilide of melting point 211°C (Stabiliser No. 6) is thus obtained.

If, in this example, the oxalic acid monoethyl ester 3,5-di-tert.butyl-4-hydroxy-anilide is replaced by an equimolecular amount of oxalic acid monoethyl ester (3,5-di-tert.butyl-4-hydroxybenzyl)-amide, and otherwise the same procedure is followed, oxalic acid 1-phospha-2,6,7-trioxabicyclo-[2,2,2]-oct-4-yl-methyl ester 3,5-di-tert.butyl-4-hydroxybenzylamide is obtained.

If, in this example, the oxalic acid monoethyl ester 3,5-di-tert.butyl-4-hydroxy-anilide is replaced by an equimolecular amount of N-(3,5-di-tert.butyl-4-hydroxybenzoyl)aminoacetic acid methyl ester and otherwise the same procedure is followed, 3,5-di-tert.butyl-4-hydroxybenzoyl-aminoacetic acid 1-phospha-2,6,7-trioxabicyclo-[2,2,2]-oct-4-yl-methyl ester is obtained.

If, in this example, the oxalic acid monoethyl ester 3,5-di-tert.butyl-4-hydroxyanilide is replaced by an equimolecular amount of 3,5-di-tert.butyl-4-hydroxyphenylcarbamoyl-aminoacetic acid metyl ester, and otherwise the same procedure is followed, 3,5-di-tert.butyl-4-hydroxyphenylcarbamoyl-aminoacetic acid 1-phospha-2,6,7-trioxabicyclo-[2,2,2]-oct-4-yl-methyl ester (Stabiliser No. 5) of melting point 250°C is obtained. The product is isolated from the reaction mixture by column chromatography on silica gel G (Merck). A mixture of 98% of toluene and 2% of methanol is used as the eluting agent. The product is preferentially eluted, before the starting material.

EXAMPLE 13

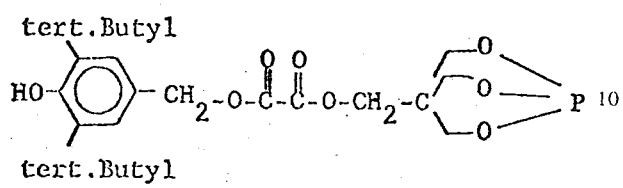

9.0 g of oxalic acid 3,5-di-tert.butyl-4-hydroxybenzyl ester/ethyl ester and 4.4 g of 4-hydroxymethyl-1-phospha-2,6,7-trioxabicyclo-[2,2,2]-octane are heated to 60°C, whereby a homogeneous melt is produced. After adding 0.1 g of sodium methylate, the reaction vessel is evacuated and the temperature is brought to 100°C. After one hour the mixture is cooled, whereupon the product solidifies to a glass. It can be powdered and then melts at approx. 80°C. Oxalic acid 3,5-di-tert.butyl-4-hydroxy-benzyl ester/1-phospha-2,6,7-trioxabicyclo-[2,2,2]-oct-4-methyl ester is thus obtained. (Stabiliser No. 7).

P: Calculated: 6.8% found: 6.5%

If, in this example, the oxalic acid 3,5-di-tert.butyl-4-hydroxybenzyl-ethyl ester is replaced by an equimolecular amount of oxalic acid 3,5-di-tert.butyl-4-hydroxyphenyl ester/ethyl ester and otherwise the same procedure is followed, oxalic acid 3,5-di-tert.butyl-4-hydroxyphenyl ester/1-phospha-2,6,7-trioxabicyclo-[2,2,2]-oct-4-yl-methyl ester is obtained.

EXAMPLE 14

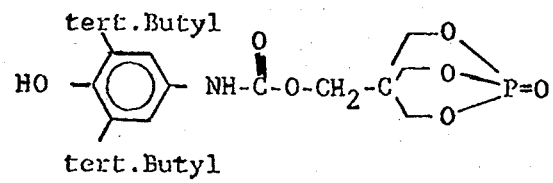

20.0 g of 3,5-di-tert.butyl-4-hydroxyphenyl-carbamic acid 1-phospha-2,6,7-trioxabicyclo-[2,2,2]-oct-4-yl-methyl ester are dissolved in 400 ml of ether. 16 g of cumene hydroperoxide are added dropwise at room temperature and the resulting mixture is stirred for 3 hours at room temperature. The product separates out as a white precipitate. After filtration and drying, 3,5-di-tert.butyl-4-hydroxyphenyl-carbamic acid 1-oxo-phospha-2,6,7-trioxabicyclo-[2,2,2]-oct-4-yl-methyl ester is obtained as a white crystal powder of melting point above 300°C (Stabiliser No. 8).

EXAMPLE 15

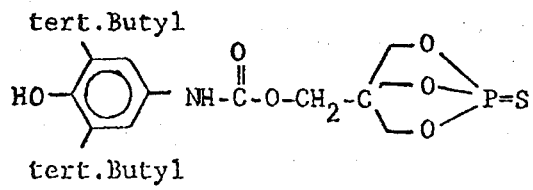

40 g of 3,5-di-tert.butyl-4-hydroxyphenyl-carbamic acid 1-phospha-2,6,7-trioxabicyclo-[2,2,2]-oct-4-yl-methyl ester are boiled with 3.2 g of sulphur and 0.2 g of sodium sulphide in 100 ml of toluene for 4 hours under reflux. The solid which separates out on cooling is filtered off and recrystallised from toluene. After filtration and drying, 3,5-di-tert.-butyl-4-hydroxyphenyl-carbamic acid 1-thiophospha-2,6,7-trioxabicyclo-[2,2,2]-oct-4-yl-methyl ester is obtained.

In the use examples which follow, the previously known stabilisers listed below are designated as follows: Pentaerythritol tetrakis-[3-(3,5'-di-tert.butyl-4-hydroxyphenyl)]-propionate: Stabiliser No. 9.
2-(2'-Hydroxy-5'-methyphenyl)-benztriazole: Stabiliser No. 10.

EXAMPLE 16

The additives listed in Table 1 are sprinkled dry, at a concentration of 0.5% onto dried polyamide-6 granules (relative viscosity = 2.9, 1% in concentrated sulphuric acid) and the sprinkle-coated mixtures are re-granulated on a single-screw extruder at 260°C. 0.3 mm thick pressed films are then produced from the granules, again at 260°C, and 1 cm wide test strips are punched from these pressed films. The activity of the additives added to the test specimens is tested by heat aging in a circulating air oven at 165°C. The thermooxidative degradation of the material during heat aging is followed by periodically measuring the relative viscosity of a 1% strength solution in 96% strength sulphuric acid, determining the time after which the relative viscosity decreases from 2.9 to a value of 2.0 (Table 1).

Table 1

| Stabiliser No. | Heat aging time at 165°C for the relative solution viscosities to decrease from 2.9 to 2.0, in hours |
|---|---|
| No additive | 5 |
| 4 | 45 |

EXAMPLE 17

100 parts of polypropylene (melt index 3.2 g/10 minutes, 230°C/2,160 g) are thoroughly mixed with 0.2 part of one of the additives listed in Table 2 below, for 10 minutes in a shaking apparatus.

The resulting mixture is kneaded for 10 minutes in a Brabender plastograph at 200°C and the mass thus obtained is subsequently pressed in a sheet press at 260°C platen temperature to give 1 mm thick sheets from which strips 1 cm wide and 17 cm long are punched.

The activity of the additives added to the test strips is tested by heat aging in a circulating air oven at 135°C and 149°C, using an additive-free test strip for comparison. 3 test strips of each formulation are employed for this test. The incipient, easily visible decomposition of the test strip is defined as the end point. The results are given in days.

Table 2

| Stabiliser No. | Days to reach incipient decomposition | |
|---|---|---|
| | 149°C | 135°C |
| No additive | ½ | 1 |
| 2 | 23 | 89 |
| 4 | 15 | 98 |
| 6 | 20 | 86 |

EXAMPLE 18

The test specimens described in Example 17 were also tested for their colour stability, in particular:

A. After incorporaton (Table 3, column 2).

b. After 500 hours' exposure in a Xenotest instrument of Messrs. Hanau (Table 3, column 3).

c. After 1 week's treatment with boiling water (Table 3, column 4).

An empirical colour scale was used for Table 3, in which 5 denotes no colour, 4 denotes a just perceptible, slight discolouration, and 3, 2, 1 and ≤ denote progressively stronger discolouration.

Table 3

| Stabiliser No. | Colour assessment according to scale 1 - 5 | | |
|---|---|---|---|
| | After incorporation | After exposure | Boiling water, 1 week |
| 2 | 4 | 4 | 5 |
| 4 | 4 | 5 | 4 |
| 6 | 4 | 4 | 4 |

EXAMPLE 19

100 parts of polypropylene (melt index 3.2 g/10 minutes, 230°C/2,160 g) are thoroughly mixed for 10 minutes in a shaking apparatus with 0.1 part of one of the additives listed in Table 4 below and 0.3 part of dilauryl thiodipropionate.

The resulting mixture is kneaded for 10 minutes in a Brabender plastograph at 200°C and the mixture thus obtained is subsequently pressed in a sheet press at 260°C platen temperature to give 1 mm thick sheets from which strips 1 cm wide and 17 cm long are punched.

The activity of the additives added to the test strips is tested by heat aging in a circulating air oven at 135°C and 149°C, using for comparison a test strip which only contains 0.3 part of dilauryl thiodipropionate. Three test strips of each formulation are employed for this test. The incipient, easily visible decomposition of the test strip is defined as the end point and the results are quoted in days.

Table 4

| Stabiliser No. | Days to reach incipient decomposition | |
|---|---|---|
| | 149°C | 135°C |
| No additive | 5 | 11 |
| 2 | 27 | 105 |
| 4 | 28 | 120 |
| 6 | 30 | 110 |

EXAMPLE 20

0.25 part of one of the additives of Table 5 is dissolved in 100 parts of a cold 25% strength polyurethane solution (ESTANE 5707 of Messrs. Goodrich).

Approx. 400 μ thick films of these solutions are spread on a glass plate by means of a film spreader and these dry, after approx. 10 minutes' drying in circulating air at 140°C, to give films of final thickness 100 μ. Accordingly, the stabilisers are present in the films in a concentration of 1.0%. Samples of these films are exposed in a Xenotest instrument, against a white cardboard background, until incipient visually perceptible yellowing is reached. The results in Table 5 are given in hours.

Table 5

| Stabiliser No. | Exposure time in the Xenotest instrument, to reach distinctly visible yellowing (in hours) | Notes |
|---|---|---|
| No additive | 100 | |
| 4 (0.5%) | 300 | |
| 4 (1%) | 400 | |
| 4+10 (1% each) | 700 | |

As can be seen from Table 5, stabiliser 4 according to the invention provides excellent protection against yellowing of polyurethane films, both when used alone and when used with co-additives.

EXAMPLE 21

Protection of polyacrylonitrile (PAN) against yellowing 0.5 part of stabiliser 4 and 25 parts of PAN are dissolved in 75 parts of dimethylformamide (DMF) at 70°C over the course of 4 hours. On visual comparison, the stabilised solution already shows a distinctly lighter colour than the solution without additive. Approx. 500 μ thick films of these solutions are spread on a glass plate and dried at 125°C for 10 minutes.

The dried films, on a white background, are assessed visually for their degree of yellowing, as follows:

Table 6

| | Discolouration |
|---|---|
| Comparison colour, without additive | Yellow |
| 0.5% of stabiliser 4 | White with very slight yellow tinge |

The same results are obtained if instead of dimethylformamide other solvents, such as, for example, an ethylene carbonate-water (80:20) mixture, are used.

EXAMPLE 22

Stabilisation of polypropylene against degradation during processing

The stabilisers of Table 7 below are homogeneously mixed, in the indicated concentrations, with polypropylene powder ("Propathene HF 20" of Messrs. ICI) and the mixture is regranulated 5 times in succession in a single-screw extruder at a maximum of 260°C and 100 revolutions/minute. After the 1st, 3rd and 5th extrusion the melt index (MI) of the material is measured (2,160 g load at 230°C; g/10 minutes). Degradation of the polymer manifests itself in a rapid rise in the melt index.

Table 7

| Stabiliser No. (concentration) | MI/2,160 g at 230°C in g/10 minutes | | | |
|---|---|---|---|---|
| | As supplied | 1st extrusion | 2nd extrusion | 3rd extrusion |
| No stabiliser | 2.50 | 11.3 | 21.5 | 35.0 |
| 2 (0.1%) | 2.50 | 2.84 | 3.22 | 6.42 |
| 9 (0.05%) + 2 (0.05%) | 2.50 | 3.03 | 3.98 | 4.11 |

As can be seen from the values in Table 7, stabiliser No. 2 according to the invention, not only by itself but also in combination with a conventional phenolic antioxidant, improves the stability of the polymer to processing.

EXAMPLE 23

Stabilisation of high molecular low pressure polyethylene against crosslinking during processing 0.05% of stabiliser 4 are homogeneously mixed with the polyethylene powder (molecule weight ~ 250,000) and the mixture is regranulated in a single-screw extruder at a maximum of 200°C, and 100 revolutions per minute. For comparison, granules without the addition of stabiliser 4 are manufactured in the same way. The melt index (MI) was determined on the starting material and on the extruder granules.

The oxidative damage to the polymer material by heat exposure during extrusion causes crosslinking of the polymer and manifests itself in a greatly increased viscosity of the polymer melt and hence a greatly reduced melt index. (Table 8).

Table 8

|  | MI (10 kg at 230°C) g/10 minutes | |
| --- | --- | --- |
|  | As supplied | After extrusion |
| No stabiliser | 0.5 | 0.1 |
| 0.05% of stabiliser | 0.5 | 0.5 |

In addition to keeping the melt index constant, stabiliser 4 causes a distinct improvement in colour after regranulation as compared to the unstabilised material.

EXAMPLE 24

Stabilisation of styrene-butadiene copolymers (SBR)

a. Preparation of the test specimens 100 parts of an unstabilised styrene-butadiene rubber ("Synpol 1,500" emulsion SBR from Texas U.S. Chem. Corp.) are homogenised for 10 minutes with 0.125 part of one of the stabilisers indicated in Table 9 in a Brabender plastograph at 150°C and 60 revolutions per minute. The mixtures stabilised in this way are pressed in a sheet press at 120°C for 5 minutes to give 1 mm thick sheets. The unstabilised rubber sheet which serves for comparison is prepared in the same way.

b. Test

The gel content determined after storage in air at elevated temperatures serves as a criterion of the protective action of the stabilisers incorporated. For this purpose, the test specimens obtained above, on aluminium supports, are kept at 100°C in a circulating air oven and examined periodically (approx. every 10 hours) for their gel content, which is determined as follows.

Approx. 1 g of the samples is cut into pieces of size approx. 3×3×1 mm and these are dissolved overnight in 100 ml of n-hexane at room temperature. These solutions are filtered through glass wool and the gel particles retained by the glass wool are rinsed with 3 times 20 ml of n-hexane, and the filtered solutions are evaporated to dryness and dried to constant weight. The gel content of the sample is then obtained from the following calculation:

$$\text{Gel content in \%} = \frac{E - A}{E} \cdot 100$$

Herein, E = total weight of the sample examined and A = weight of the dissolved part of the sample examined.

The time after which a sudden rise in the gel content occurs, after an induction period characteristic of the additive examined, is defined as the end point. (Table 9).

Table 9

| Stabiliser No. (0.125%) | Induction period, until a high gel content rapidly arises |
| --- | --- |
| No stabiliser | 5 hours |
| 2 | 40 hours |
| 4 | 35 hours |
| 6 | 20 hours |
| 8 | 20 hours |

What we claim is:

1. A compound of the formula

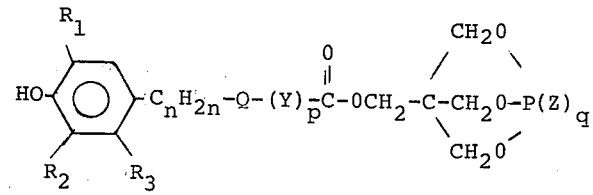

wherein
$R_1$ denotes alkyl of 1 to 5 carbon atoms,
$R_2$ denotes hydrogen or alkyl of 1 to 5 carbon atoms,
$R_3$ denotes hydrogen or methyl,
Q denotes —O—, —NH—, —NHCO—, —OCO— or —NHCONH—,
Y denotes —CH$_2$— or —CH$_2$CH$_2$SCH$_2$—,
Z denotes oxygen or sulfur,
$n$ denotes 0 to 4,
$p$ denotes 0 or 1, and
$q$ denotes 0 or 1.

2. A compound according to claim 1 wherein
$R_1$ denotes methyl, isopropyl or tert-butyl,
$R_2$ denotes methyl, isopropyl or tert-butyl,
$R_3$ denotes hydrogen,
Q denotes —O—, —NH—, —NHCO—, —OCO— or —NHCONH—,
Y denotes —CH$_2$— or —CH$_2$CH$_2$SCH$_2$—,
Z denotes oxygen or sulfur,
$n$ denotes 0 to 4,
$p$ denotes 0 or 1, and
$q$ denotes 0 or 1.

3. A compound according to claim 1 wherein
$R_1$ and $R_2$ denote tert-butyl,
$R_3$ denotes hydrogen,
Q denotes —O—, —NH— or —NHCO—,
Y denotes —CH$_2$—,
Z denotes oxygen,
$n$ denotes 0,
$p$ denotes 0 or 1, and
$q$ denotes 0 or 1.

4. A compound according to claim 1 of the formula

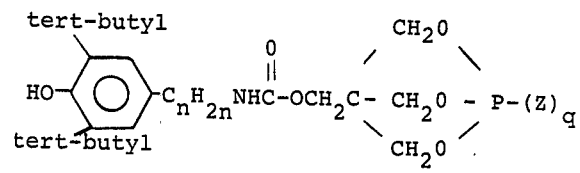

wherein $n$ denotes an integer 0 to 4,
Z denotes oxygen or sulfur, and
$q$ denotes 0 or 1.

5. A compound according to claim 1 of the formula

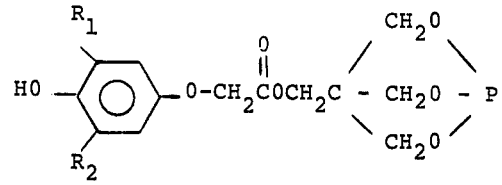

wherein $R_1$ denotes methyl, isopropyl or tert-butyl, and $R_2$ denotes methyl, isopropyl or tert-butyl.

6. A compound according to claim 1 of the formula

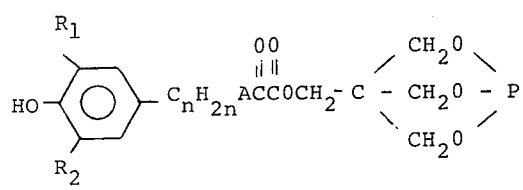

wherein $R_1$ denotes methyl, isopropyl or tert-butyl,
$R_2$ denotes methyl, isopropyl or tert-butyl,
A denotes —O— or —NH—, and
$n$ denotes 0 or 1.

7. A compound according to claim 1 of the formula

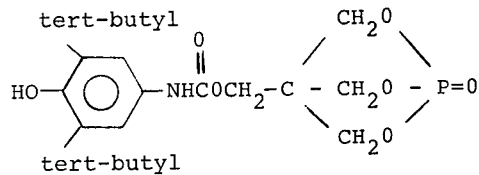

8. A compound according to claim 1 of the formula

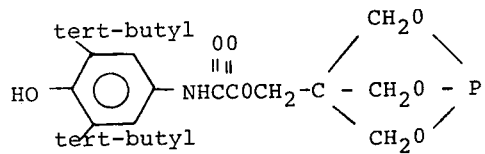

9. A compound according to claim 1 of the formula

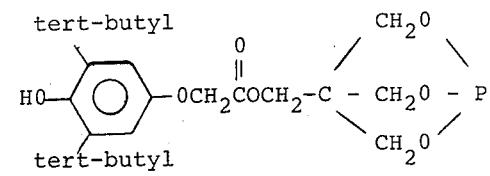

10. A compound according to claim 1 of the formula

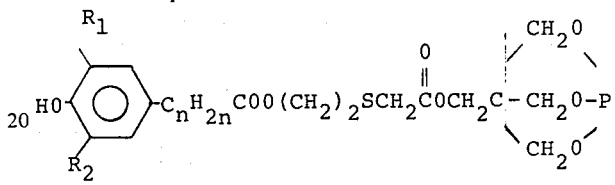

11. A compound of the formula

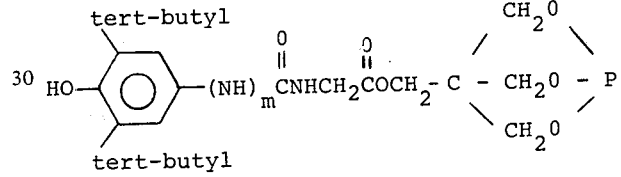

wherein $R_1$ denotes methyl, isopropyl or tert-butyl,
$R_2$ denotes methyl, isopropyl or tert-butyl, and
$n$ denotes 0 to 2.

12. A compound of the formula

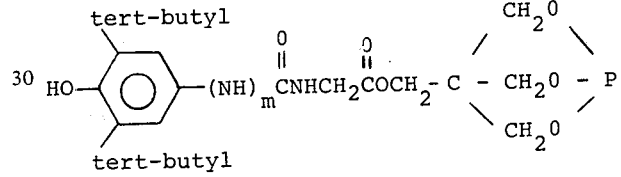

wherein $m$ denotes 0 or 1.

* * * * *